Figures 1, 2:
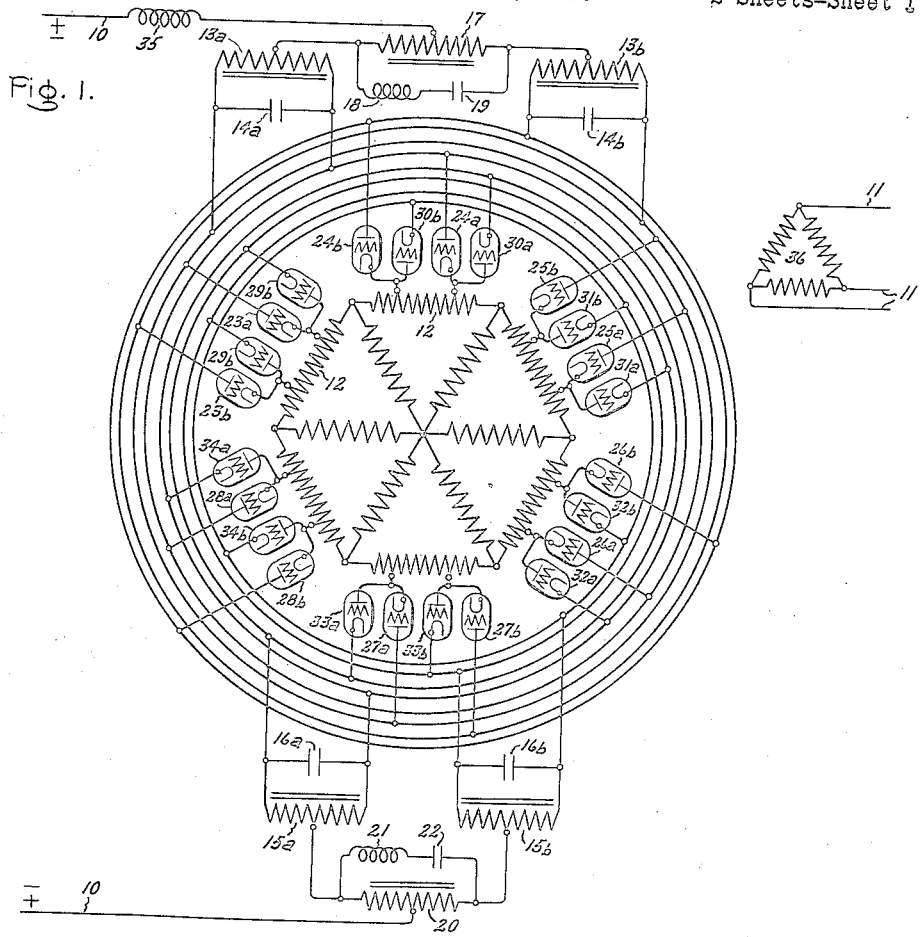

April 7, 1936.  C. H. WILLIS  2,036,844
ELECTRIC VALVE CONVERTING SYSTEM
Filed March 7, 1934  2 Sheets-Sheet 1

Inventor:
Clodius H. Willis,
by Harry E. Dunham
His Attorney

April 7, 1936.  C. H. WILLIS  2,036,844
ELECTRIC VALVE CONVERTING SYSTEM
Filed March 7, 1934  2 Sheets-Sheet 2
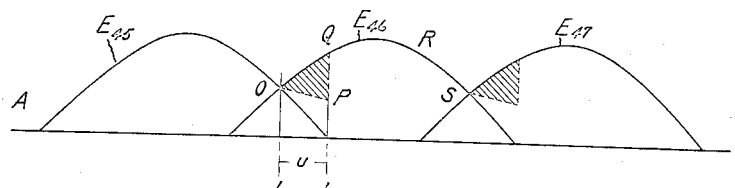
Fig. 3.
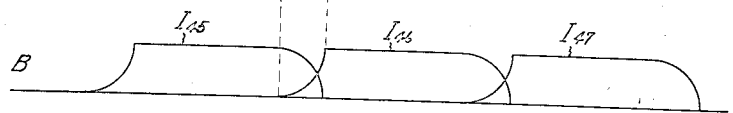
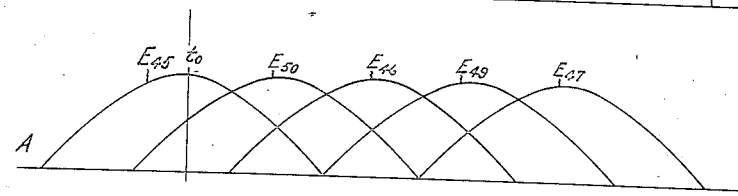
Fig. 4.
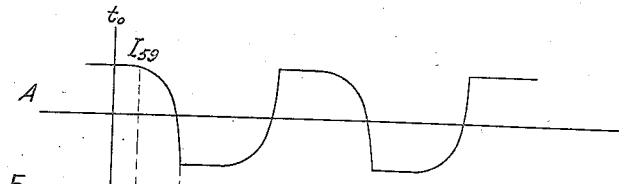
Fig. 5.
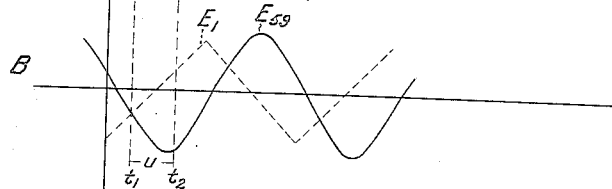
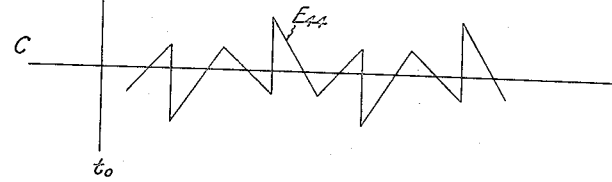
Inventor:
Clodius H. Willis,
by Harry E. Dunham
His Attorney Patented Apr. 7, 1936

2,036,844

UNITED STATES PATENT OFFICE 2,036,844

ELECTRIC VALVE CONVERTING SYSTEM

Clodius H. Willis, Schenectady, N. Y., assignor to General Electric Company, a corporation of New York Application March 7, 1934, Serial No. 714,473

6 Claims. (Cl. 175—363)

My invention relates to electric valve converting systems, and more particularly to such systems including electric valves for transmitting energy between direct and alternating current circuits.

This application is a continuation in part of the application, Serial No. 582,587, filed December 22, 1931, and entitled Electric valve converting systems.

Heretofore there have been devised numerous apparatus including electric valves for transmitting energy between direct and alternating current circuits, or alternating current circuits of different frequencies, phases, or voltages. The use of vapor electric discharge valves in such apparatus has been found particularly advantageous because of the relatively large amounts of power which may be handled at ordinary operating voltages. On the other hand, the use of valves of this type has imposed certain power factor limitations upon the arrangements of the prior art because of the commutation requirements of this type of valve. It is well understood in the art that the grid of the more common vapor electric discharge valve is effective to control the starting of current in the valve, but that generally the current must be interrupted by circuits external to the valve. In my copending applications, Serial Nos. 566,367 and 566,372, filed October 1, 1931, and in the copending application of C. A. Sabbah, Serial No. 566,378, filed October 1, 1931, all assigned to the same assignee as the present application, there are disclosed certain electric valve converting apparatus which are adapted to the requirements of valves of the vapor electric discharge type, and which substantially eliminate the power factor limitations of such arrangements in the prior art. In these copending applications there are disclosed electric valve converting apparatus of the type including an inductive network, a plurality of electric valves, and means for introducing into the apparatus an alternating potential effective to commutate the current between the valves against the electromotive force of the inductive winding interconnecting the valves, which normally opposes such commutation under certain power factor conditions.

It is an object of my invention, therefore, to provide an improved electric valve converting system for transmitting energy between direct and alternating current circuits which will overcome the above-mentioned disadvantages of the arrangements of the prior art, and which will be simple and reliable in operation.

It is another object of my invention to provide an improved electric valve converting system for transmitting energy between direct and alternating current circuits in which the wave form of the alternating current will be substantially improved.

It is another object of my invention to provide an improved electric valve converting system which is particularly suitable for correcting the power factor of an alternating current system to which it is connected.

It is another object of my invention to provide an improved electric valve converting system wherein during normal operation the reactance of the alternating current circuit and the interphase inductive windings can be neutralized to improve the direct current regulation characteristics.

It is another object of my invention to provide an improved electric valve converting system wherein means are provided for selectively reducing the effect of the reactance of the alternating current circuit and the interphase inductive windings to thereby control the output voltage and the direct current regulation characteristics.

It is a further object of my invention to provide an improved electric valve converting system whereby the inductive interphase windings may be reduced in size thereby providing a more economical system.

It is a still further object of my invention to provide an improved electric valve converting system wherein means are provided for improving the power factor of the said converting system.

In accordance with one embodiment of my invention, direct and alternating current circuits are interconnected through a pair of electric valve converting apparatus which may be any of the several types well known in the art, although I prefer to use apparatus of the type disclosed in the aforementioned applications, which substantially eliminate power factor limitations on the alternating current circuits. Each of the apparatus comprises a polyphase inductive network and a plurality of electric valves, the connections of each group of valves to its associated network being in staggered phase relation with respect to the connections of the valves of the other apparatus. If desired, a common inductive network may be used for both apparatus. Interposed in the connections between the two apparatus in the direct current circuit is a circuit which produces commutation between alternate valves of each of said groups of valves. In one form this circuit contains a two-part inductive winding so connected that the two portions thereof have a cumulative magnetizing effect upon the alternating current components, with the result that the sum of the currents of the two apparatus is maintained substantially constant. This inductive winding is given sufficient reactance effectively to prevent the transfer of current, or in other words, to prevent commutation between the two electric valve apparatus. The addition of a special commutating circuit to this inductive winding permits the load current gradually to transfer back and forth between the two-valve apparatus, thus securing the equivalent of a continuously moving point of entrance in the inductive network. In accordance with my invention, this special commutating circuit comprises a highly reactive circuit which is connected across the two part inductive winding to facilitate the transfer of current between the apparatus.

For a better understanding of my invention, together with other and further objects thereof, reference is had to the following description taken in connection with the accompanying drawings in which Fig. 1 illustrates an embodiment of my invention for transmitting energy between a direct current circuit and a polyphase alternating current circuit, in which a commutating circuit is connected across the load distributing winding to facilitate the transfer of current between the apparatus; Fig. 2 illustrates the application of my invention to a simplified converting system for the purpose of presenting a simplified explanation of the operation of my invention, while Figs. 3, 4, and 5 show curves which are used to explain and illustrate the operating characteristics of my invention.

Referring to Fig. 1 of the drawings, there is illustrated a twelve-phase full wave arrangement embodying my invention for transmitting energy between a direct current circuit 10 and a three-phase alternating current circuit 11. The reference numerals followed by the subscript "a" indicate elements of one apparatus, while the same numerals followed by the subscript "b" refer to the corresponding elements of the other apparatus. In this arrangement a six-phase network 12, provided with twelve symmetrically spaced terminals, serves as the inductive windings for both electric valve converting apparatus. One apparatus comprises a commutating winding 13a provided with an electrical midpoint for connection to one side of the direct current circuit, and with end terminals each connected to alternate valves of the group 23a to 28a, inclusive, which in turn are connected to alternate phase terminals of the network 12. A commutating capacitor 14a is connected across the winding 13a. This apparatus also includes a commutating winding 15a and the associated commutating capacitor 16a similarly connected between the other side of the direct current circuit and a group of valves 29a to 34a, inclusive, which are connected to the same terminals of the network 12 as the group 23a to 28a but with opposite polarities. In this way, each terminal of the windings 13a and 15a is connected to every fourth phase terminal of the network 12. The other valve converting apparatus comprises the same elements indicated by the same reference numerals with the subscript "b", the valves included in apparatus a and apparatus b being connected to staggered phase terminals of the windings 12. The electrical midpoints of the commutating windows 13a and 13b are interconnected through a two part inductive winding 17, the electrical midpoint of which is connected to one side of the direct current circuit. Similarly, the other side of the direct current circuit is connected to the windings 15a and 15b through the two part inductive winding or reactor 20. In this arrangement a commutating circuit comprising a reactor 18 and a capacitor 19 is connected across the inductive winding 17, the constants being so chosen that this circuit presents a reactance which in cooperation with the reactance of the inductive winding 17 and the reflected reactance of the associated alternating current circuit produces commutation which will provide the desired characteristics or power factor. Similarly a circuit comprising a reactor 21 and a capacitor 22 is connected across the inductive winding 20. The grid circuit has been omitted in this figure for the sake of clarity, but it is to be understood that any suitable grid circuit may be used, as for instance, the grid circuit disclosed in the above-mentioned parent application, Serial No. 582,587.

In the operation of this apparatus, one valve connected to the positive side of the direct current circuit and one valve connected to the negative side of the direct current circuit of each apparatus is conductive at any given instant. The current is gradually transferred from one apparatus to the other and is commutated between the adjacent valves of each apparatus when it has been reduced approximately to zero. One of the functions of the commutating circuit connected across the commutating reactors 17 and 20 is to maintain the current transfer between the two apparatus practically independent of the load at all power factors. The alternating current in the commutating circuit tends to build up to an infinite value, even under adverse power factor conditions. However, due to the unidirectional conductivity of the electric valves, it is impossible for this current to build up to a value greater than one-half the load current, which corresponds to a complete transfer of load to one of the apparatus.

As will be well understood by those skilled in the art, the apparatus may be operated under any power factor conditions between substantially zero power factor leading or lagging, since potentials across the capacitors 14 and 16 are effective to commutate the current between the several electric valves even when the electromotive force of the windings interconnecting these valves opposes such commutation. This operation is explained in greater detail in the parent application and in the copending applications above referred to. It will also be understood by those skilled in the art that energy may be transmitted through the apparatus in a direction opposite from that just described; that is, from the alternating current circuit 11 to the direct current circuit 12. The operation of the apparatus under such conditions is substantially similar but the polarity of the direct current circuit is reversed.

While I have shown, by way of example, an apparatus for transmitting energy from a direct current circuit to a three-phase alternating current circuit through a polyphase converter network, it will be understood that the invention is equally applicable to any other polyphase arrangement, and may be used without departing from my invention in its broader aspects.

Reference may now be had to Fig. 2 wherein there is illustrated for the purpose of simplified explanation of the operation and function of my invention, a half wave double-Y electric valve converting arrangement which may operate as a rectifier for transmitting energy between a three-phase alternating current circuit 41 and a direct current circuit 40. This arrangement includes electric valve converting apparatus which may be any of the several types well known in the art, although I prefer to use apparatus which consists of a pair of three-phase inductive networks 42 and 43 provided with electrical neutrals connected to one side of the direct current circuit through opposite halves of an inductive winding 44 and with end terminals connected to the other side of the direct current circuit through electric valves 45 to 50, inclusive. The electric valves 45 to 50, inclusive, are each provided with an anode, a cathode, and a control grid, and may be any of the several types well known in the art, although I prefer to use valves of a vapor electric discharge type or a type containing an ionizable medium. As is well understood by those skilled in the art, the inductive networks 42 and 43 are displaced in phase substantially 60 electrical degrees so that the phase terminals of these two windings are in staggered phase relation. It is desirable, also, to include a smoothing reactor 51 in the direct current circuit to maintain the direct current constant when operating as an inverter or rectifier. The several networks 42 and 43 comprise one side of a polyphase transformer, the other side of which comprises a three-phase network 52 connected to the alternating current circuit 41. The reactances of the alternating current circuit including the reflected reactance from the alternating current line 41 and the transformer winding 52 are shown in this figure for purposes of clarity as being lumped inductive reactances 53–58, inclusive, connected between the anodes of the discharge devices 45–50 inclusive, and the respective inductive networks 42 and 43, to which the anodes are connected. The grid circuit has been omitted in this figure for the sake of clarity, but it is to be understood that any suitable grid circuit may be used, as for instance, the grid circuit disclosed in the above-mentioned parent application Serial No. 582,587. The arrangement just described is one which is well known in the art and it is such an arrangement which will be referred to in connection with an explanation in which it will be pointed out the difference in operation between this circuit and a similar circuit which includes my invention.

In accordance with my invention, a commutating circuit comprising a capacitor 59 and an inductor 60 is connected across the inductive winding 44. The purpose and operation of this commutating circuit will become apparent in connection with the explanation of the operation of the arrangement in accordance with my invention.

If in Fig. 2 the commutating circuit comprising the capacitor 59 and the inductor 60 is omitted, we have a half wave double-Y electric valve converting circuit which is well known in the art. For the purposes of explanation we will assume that this converting circuit is operating as a rectifier. Under such conditions the interphase transformer 44 normally prevents commutation between the two three-phase rectifiers connected to the inductive networks 42 and 43, except at very light load, so that the load current is approximately the magnetizing current of the inductive winding 44. At greater loads the commutation is between the anodes of the discharge devices 45, 46, and 47 for one-half of the load current and between the anodes 48, 49, and 50 for the other half of the load current.

Reference may now be had to Fig. 3 in which curve A represents the voltages of the anodes of the discharge devices 45, 46, and 47 and curve B represents the currents of the anodes of these same discharge devices. At the instant $t_1$ the anode of the discharge devices 45 and 46 have equal voltages, as indicated by the curves $E_{45}$ and $E_{46}$, and the current begins to transfer from the anode of valve 45 to the anode of valve 46. This will be noted from observation of the curve $I_{45}$ and the curve $I_{46}$ is increasing from the instant of time $t_1$. This commutation is normally opposed by the inductive reactances of the phase windings of the network 42 connected to the discharge devices 45 and 46, which reactances are represented by the lumped reactors 53, 54, etc.

During the interval of commutation $u$ which extends from the time $t_1$ to $t_2$, any difference in voltage between the phases as indicated by $E_{45}$ and $E_{46}$ is absorbed by the anode reactors 53 and 54 and the output voltage of the rectifier is the average of the voltages of the phases $E_{45}$ and $E_{46}$ as indicated by the line OP.

At any instant during commutation, the difference between the voltages $E_{45}$ and $E_{46}$ is the commutating voltage, $E_t$ which may be expressed as $E_t = E_{46} - E_{45}$. This commutating voltage effects a change of current through the commutating reactances 53 and 54 of the two phases which reactances may be designated by $L_{53}$ and $L_{54}$. Thus, we may write $$E_t = L_{46}\frac{di_{46}}{dt} - L_{45}\frac{di_{45}}{dt}$$

wherein $I_{45}$, the anode current of the valve 45, is decreasing and $I_{46}$ the anode current of the valve 46 is increasing. If we assume the total current constant and the commutating reactances of the phases equal, we may then write $$E_t = 2L\frac{di}{dt}$$

On integrating over the commutating angle $u$ when the current per anode changes from 0 to I, the maximum anode current, we obtain the following equation:

$$\frac{1}{2}\int_0^u E_t dt = LI$$

This expression represents the area of the triangle O P Q designated in Figure 3A.

If the rectifier transformers and supply circuit were to have no inductance the commutation would be instantaneous between phases, and the output voltage would be the average of the curve O Q R S shown in Fig. 3A. However, due to the reactance in the supply circuit of the transformers, there is an interval of overlap between the voltages of the anodes shown by the period $u$ in the Fig. 3A, and the output voltage is an average of the broken curve O P Q R S. The loss in the average value of the output voltage is therefore the areas of all triangles similar to O P Q occurring in one second's operation. If there are $n$ phases or anodes in the commutating sequence (three for the double-Y) and the frequency is $f$ cycles per second, then the loss in voltage $E_v$ caused by the reactance is: $E_v = nfLI$ where I is the current per anode and L is the commutating reactance per anode.

In accordance with my invention, the arrangement disclosed in Fig. 2 utilizes a commutating circuit comprising a capacitor 59 and an inductor 60. The operation of my invention will be apparent by reference to Figs. 4 and 5 in connection with the following explanation. The addition of this commutating circuit now permits the current to transfer across the inductive winding 44 and the rectifier operates now as a six-phase rectifier. However, the commutation of this arrangement differs from that of the normal six-phase because the capacitor 59 starts the transfer of the current before the voltage $E_{50}$ of the anode of the discharge device 50 equals the voltage $E_{45}$ of the anode of the discharge device 45. It will now be assumed that a steady state of operation has been reached and that at the instant of time $t_0$ in Fig. 4A, the anode of the discharge device 45 is at the middle of its conducting period and is carrying the entire load current $I_0$. Due to the fact that the interphase winding 44 produces a dividing action, a current will flow in the commutating circuit as represented by $I_{59}$ in Fig. 5A.

This current $I_{59}$ is equal to half the difference between the anode currents on the opposite sides of the rectifiers shown in the curve 4B. The current $I_{59}$ flowing through the capacitor 59 will cause a voltage $E_{59}$ across this capacitor as shown in Fig. 5B. From this curve it will be apparent that the voltage $E_{59}$ of the capacitor does not pass through zero at the middle of the conducting period of the discharge device, but is shifted in a lagging direction because of the asymmetry of the rise and fall of the current as will be noted by the curve $I_{59}$. The dotted triangular wave $E_I$ in Fig. 5B represents approximately the interphase voltage which would exist in a normal double-Y circuit arrangement. At the point $t_1$ where $E_{59}$ intersects $E_I$, or the voltage across the capacitor is equal to the difference in voltage between the voltages of the phases of the discharge devices 45 and 46, the current will begin to transfer from the anode of the device 45 to the anode of the device 46. It is also evident that the capacitor 59 operates to advance the instant $t_1$ at which commutation begins.

This commutation continues at an accelerating rate until the current $I_0$ is transferred. The dotted line $t_2$ indicates the time at which commutation is completed. During the commutation interval $u$ which is equal to $(t_2-t_1)$, the voltage across the interphase winding 44 is equal to the normal double-Y interphase voltage as shown by the dotted curve in Fig. 5B. However, as soon as commutation is completed, the anode 45 is free and the voltage across the inductor 60 disappears because the current $I_{59}$ is constant and the capacitor voltage $E_{59}$ is impressed across the interphase transformer 44. The resulting interphase transformer voltage $E_{44}$ is therefore a composite of the curves $E_I$ and $E_{59}$ as shown in Fig. 5C. The interphase voltage $E_{44}$ follows the curve $E_I$ during commutation and the curve of $E_{59}$ when commutation is not taking place.

This analysis, of course, assumes that the direct current smoothing reactor 51 is so large that the variations of the total direct currents are negligible. In the circuit arrangement of Fig. 2, it may be seen that any variation of current through the commutating circuit comprising the capacitor 59 and the inductor 60 involves an equal change of current through the equivalent commutating inductors 53 and 58. This is true, even though the actual inductance may be located in the primary of the transformer circuit. The equivalent commutating reactance $$L_t = L_{60} + L_{53} + L_{58} \qquad 5$$

where $L_t$ represents the total of the equivalent commutating reactance, and any desired portion of the commutating inductor $L_t$ may be located in the primary supply circuit. When the major portion or all of the commutating inductance is located in either the primary or transformer secondary circuit, it has the added advantage of protecting the tube in case of arc back or direct current short circuit condition.

It will be further evident to any one skilled in the art that, since the inductor $L_{53}$ and $L_{58}$ are equally involved in commutation, that it makes no difference if they are not equal. Consequently, there will be no load unbalance and no saturation of the inductor 44, even though the leakage reactances of the inductors on opposite sides of the rectifier are considerably unbalanced. It will also be apparent from the curve of the interphase voltage $E_{44}$ as disclosed in Fig. 5C, that the addition of the commutating circuits comprising capacitor 59 and the inductor 60, reduces the effective value and doubles the frequency of the voltage existing across the inductive winding or transformer 44. The absence of direct current saturation of the inductive winding between the polyphase networks, and the increase in the frequency of the voltage appearing across this inductive winding, all cooperate to permit the use of a smaller and more economical inductive winding or transformer.

The commutating circuit introduces a capacitative reactance into the circuit which, during normal operation, neutralizes the effect of all or a portion of the reactance of the inductive winding between the polyphase networks, the reactances or reflected reactances of the polyphase alternating current network. By introducing sufficient capacitive reactance into the system by means of the commutating circuit, higher alternating current circuit commutating reactances may be used.

The higher commutating reactances, under abnormal conditions, will aid in reducing the severity of arc backs and short circuit conditions. Under these arc-back and short-circuit conditions it will be apparent to one skilled in the art that the converter system is no longer operating with its normal commutation and hence, because of this change in commutation, the commutating circuit no longer tends to neutralize the reactances of the various transformers and windings. Thus, it will be apparent, that during normal operation the commutating circuit reduces the effect of the reactances of the circuit, but during abnormal conditions, the beneficial effect of the high reactances to reduce the effect of arc backs and short circuits is retained.

The addition of the commutating circuit improves the power factor of the converting system because, during normal operation, the effect of all or a portion of the reactance of the interphase transformer and the alternating current network has been neutralized. By introducing different reactances by means of this circuit, the power factor of the converter system may be controlled.

This neutralization of any portion of the reactance of the system also has the effect of improving the direct current regulation characteristics. Obviously, of course, when a converter system is used as a rectifier, certain other direct current regulation characteristics may be desirable. By controlling the amount of the capacitive or inductive reactance introduced into the system by means of the commutating circuit, we may obtain the desired regulation characteristic.

While the above explanation, given in connection with the arrangement disclosed in Fig. 2 of the drawings, illustrates one type of application of my invention to an electric valve converting apparatus, it is believed that this explanation presents such generic principles that it will be apparent to any one skilled in the art that with certain modifications other applications of my invention may be made to electric valve converting apparatus utilizing a plurality of groups of polyphase electric valve converting apparatus, thereby to obtain commutation between alternate electric valves of each of said plurality of electric valve apparatus.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. The combination, in an electric valve converting system operating between direct and polyphase alternating current circuits and having a plurality of apparatus each comprising electric valves and a polyphase inductive network, and means comprising a reactive element connected effectively between said polyphase inductive networks and said direct current circuit for producing commutation alternately between valves of said plurality of polyphase electric valve apparatus, said means having a reactance of such sign and magnitude as to neutralize normally to the proper degree the effect of the reactance of said polyphase inductive network and the reflected reactance of said polyphase alternating current circuit.

2. The combination, of an electric valve converting system comprising a direct current circuit, an alternating current circuit, a plurality of electric valve converting apparatus each comprising a polyphase inductive network and a plurality of electric valves for interconnecting said circuits, and a commutating circuit effectively connected between said polyphase inductive networks and said direct current circuits for effecting a transfer of the load current alternately between individual valves of said plurality of valve converting apparatus, said commutating circuit having sufficient capacitive reactance for neutralizing normally the effect of the reflected reactance of said alternating current circuit and the reactance of said polyphase inductive network.

3. The combination in an electric valve converting system comprising a direct current circuit, an alternating current circuit, a plurality of electric valve converting apparatus each comprising a polyphase inductive network and a plurality of electric valves for interconnecting said circuits, of an inductive winding interconnecting said apparatus with said direct current circuit, and means connected to said inductive winding for neutralizing normally the effect of the reactance of said inductive winding and said alternating current circuit.

4. The combination in an electric valve converting system operating between direct current and polyphase alternating current circuits and having a plurality of apparatus each comprising electric valves and a polyphase inductive network, of an inductive winding for interconnecting said apparatus with said direct current circuit, and means for controlling the direct current regulation characteristics, said means comprising a reactive element connected across said winding and of such sign and magnitude as to neutralize normally to the proper degree the effect of the reactance of said winding and the reflected reactance of said alternating current networks and circuits.

5. The combination in an electric valve converting system operating between direct current and polyphase alternating current circuits, and having a plurality of apparatus each comprising electric valves and a polyphase inductive network, of an inductive winding for interconnecting said apparatus with said direct current circuit, and a commutating circuit connected across said inductive winding, said commutating circuit having a reactance of opposite sign to the reactance of said winding and said polyphase network whereby a higher reactance may be connected to be effectively in series with said valves to reduce the effects of arc back and short circuit conditions.

6. The combination, in an electric valve converting system comprising a direct current circuit, an alternating current circuit, a plurality of electric valve converting apparatus each comprising a polyphase inductive network and a plurality of electric valves for interconnecting said circuits, of an inductive winding interconnecting said apparatus with said direct current circuit, and a circuit having substantial capacitive reactance connected across said inductive windings for preventing load unbalance and interphase transformer saturation, and for increasing the frequency and decreasing the voltage of the interphase currents of said winding thereby reducing the magnitude of the inductive winding normally required.

CLODIUS H. WILLIS.